(12) United States Patent
Strandemar et al.

(10) Patent No.: US 7,544,944 B2
(45) Date of Patent: Jun. 9, 2009

(54) CAMERA AND METHOD FOR USE WITH CAMERA

(75) Inventors: Katrin Strandemar, Rimbo (SE); Malin Ingerhed, Sollentuna (SE)

(73) Assignee: FLIR Systems AB, Danderyd (SE)

( * ) Notice: Subject to any disclaimer, the term of this patent is extended or adjusted under 35 U.S.C. 154(b) by 0 days.

(21) Appl. No.: 11/772,259

(22) Filed: Jul. 2, 2007

(65) Prior Publication Data
US 2009/0008558 A1    Jan. 8, 2009

(51) Int. Cl.
*G01J 1/42* (2006.01)
(52) U.S. Cl. ................................. 250/339.05
(58) Field of Classification Search ............ 250/339.05; 348/34, 35, 36, 37, 38
See application file for complete search history.

(56) References Cited

U.S. PATENT DOCUMENTS 5,555,324 A    9/1996    Waxman et al.
H001599 H  * 10/1996    Task et al. ..................... 348/33

FOREIGN PATENT DOCUMENTS

EP    0343634 A2    11/1989
EP    1299699 B1    4/2003
WO    WO-2006/060746 A2    6/2006

OTHER PUBLICATIONS

Johnson et al., "Commercial Fusion Camera,", 2006, Thermosense XXVII, edited by Jonathan J. Miles et al., Proc. of SPIE vol. 6205, pp. 62050H-1-62050H-9.*
International Search Report and Written Opinion mailed on Oct. 22, 2008, for PCT application No. PCT/SE2008/050780 filed on Jun. 26, 2008, 10 pages.

* cited by examiner

*Primary Examiner*—David P Porta
*Assistant Examiner*—Kiho Kim
(74) *Attorney, Agent, or Firm*—Morrison & Foerster LLP

(57) ABSTRACT

A method of displaying together IR image data and visible light image data corresponding to the same field of view in the same image is disclosed, comprising displaying IR image data in at least a first portion of the image and visible light image data in at least a second portion of the image. The method is characterized by the step of displaying the IR image data according to a colouring scheme adapted to the temperature range relevant to the first portion of the image. The resolution in the relevant temperature range may be increased by applying the entire range of colours available in the colouring scheme to the selected temperature range.

8 Claims, 1 Drawing Sheet

CAMERA AND METHOD FOR USE WITH CAMERA

TECHNICAL FIELD

The present invention relates to a camera for producing IR images and visible light images and images comprising a mix of IR and visible light data, and to a method for use with such a camera.

BACKGROUND AND RELATED ART

In recent years methods and cameras have been proposed for combining IR images and visible light images in various ways, often referred to as image fusion. Typically, a camera will have an imaging part for capturing IR image data, another imaging part for capturing visible light image data and means for processing the image data in such a way that they can be displayed in the same image. Such functions may be helpful, for example, in identifying the position of a hot, or cold, object.

Typically, the field of view of the visible light image is greater than the field of view of the IR image. In any case the fields of view will differ, since the optical systems capturing the two images will not be placed in exactly the same position. This is a well known optical phenomenon called parallax. Hence, before displaying a fused, or blended, image the two images must be aligned.

EP patent 1 299 699 discloses a method of displaying visible light image data and IR image data in the same image, and a camera comprising imaging means both for IR radiation and visible light. The data can be combined in a number of different ways, for example, in dependence of the temperature of each respective pixel.

This patent also mentions the need for correcting the parallax caused by the image capturing means for IR and visible light, respectively, being placed at a certain distance from each other. Two main methods of parallax correction are suggested: by optical means such as mirrors or by electronic means. How to correct the parallax by electronic means is not discussed in detail.

International patent application WO 2006/060746 discloses parallax correction based on the distance to the object. The distance to the object is in turn determined by the focusing distance. The method suggested in WO 2006/060746 is to use a magnet mounted on the IR lens and a Hall sensor mounted in the optics housing, or vice versa, whereby the Hall sensor will measure the distance to the magnet and hence the focusing distance. The actual focusing of the camera is performed manually, in a way known per se, by turning a focus ring. As an alternative it is suggested to align the images by manually displacing one relative the other until they overlap correctly.

A number of ways of combining the IR and visible light image data are proposed in WO 2006/060746. For example, the visible image may be shown in a grey scale and the IR image superimposed on this image in colour. Alternatively, the visible light image may be displayed, but for pixels in which the temperature values exceed a certain threshold value the visible light pixels may be replaced by IR image pixels.

It is an object of the present invention to improve the presentation of the combined IR and visible light image.

SUMMARY OF THE INVENTION

This object is achieved according to the invention by a method of fusing IR image data and visible light image data corresponding to the same field of view in the same image comprising displaying IR image data in at least a first portion of the image and visible light image data in at least a second portion of the image, said method being characterized by the step of displaying the IR image data according to a colouring scheme adapted to the temperature range relevant for the first portion of the image.

The object is also achieved by a camera comprising a first imaging part for capturing IR image data of a first field of view, a second imaging part for capturing visible light data of a second field of view at least partially overlapping the first field of view, processing means for adjusting the first and second field of view relative to each other in dependence of the focusing distance of the first or second imaging part, and processing means for selecting at least a first portion of the image in which IR image data is to be displayed and at least a second portion of the image in which visible light image data is to be displayed, said camera being characterized in that said processing means is arranged to apply a colouring scheme for IR data adapted to the temperature range relevant for the at least first portion of the image.

Hence, according to the invention the resolution in the relevant temperature range is increased by applying the entire range of colours available in the colouring scheme to the selected temperature range. Temperatures that are so close to each other that they would have essentially the same colour if the normal colouring scheme were used, may, with the method according to the invention, have different colours that can easily be distinguished.

For example, in a colour scheme ranging from blue for low temperatures to red for hot temperatures, all temperatures in the middle of the range may be represented as different nuances of yellow. All temperatures in the upper part of the range will be different nuances of red, and all temperatures in the lower part of the range will be different nuances of blue. Hence, temperatures that are close to each other are generally difficult to distinguish from each other. According to the invention, the whole range of colours may be applied to a part of the temperature interval. In this way, a range of temperatures that would be represented by similar nuances in the normal colouring scheme will be represented by a wider range of colours, for example, ranging from blue to red. For the parts of the image having a temperature outside of this interval visual light image data will be displayed.

Preferably the camera further comprises user input means for receiving information about the at least first portion of the image, to enable the selection of the at least first portion of the image comprising an object, or part of an object, or interest. Alternatively, or additionally the camera may further comprise user input means for selecting the relevant temperature range. This will enable the selection of the at least first portion of the image as at least a first portion of the image having a temperature within a selected temperature range.

BRIEF DESCRIPTION OF THE DRAWINGS

The invention will be discussed in more detail in the following, by way of example and with reference to the appended drawings, in which.

DETAILED DESCRIPTION OF EMBODIMENTS

Figure 1:
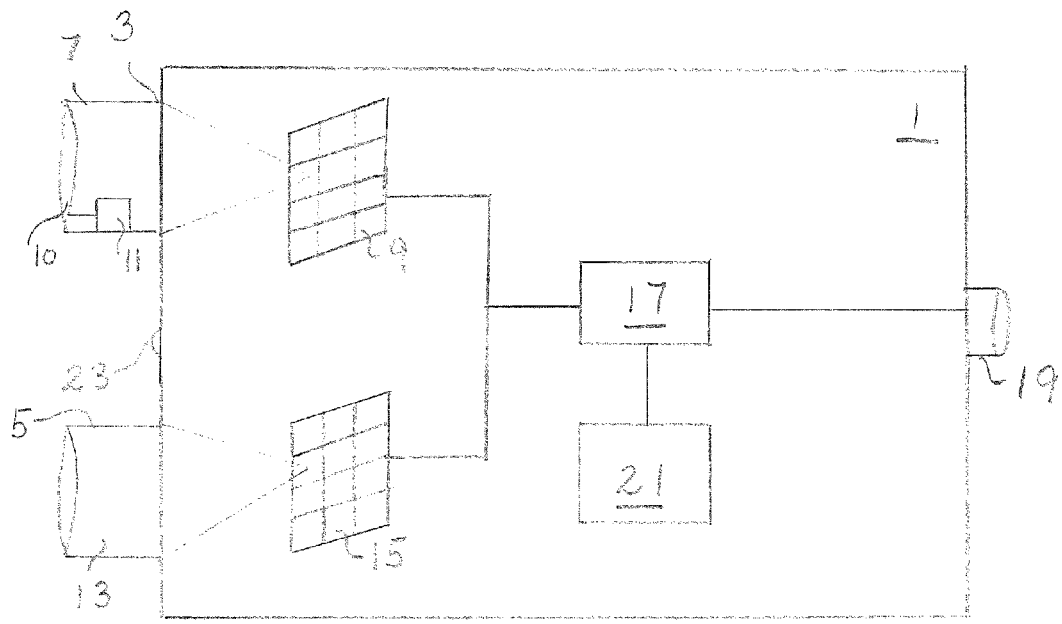
FIG. 1 illustrates a camera that may be used according to the invention

FIG. 1 illustrates schematically a camera 1 having a first imaging part 3 for capturing IR images and a second imaging part 5 for capturing visible light images. The first imaging part 3 comprises IR optics 7 that focuses incoming IR radiation onto an array 9 of IR sensing elements in a way known per se. Preferably the IR optics part comprises one or more IR lenses 10, one of which may be driven by a motor 11 for automatic and/or manual focusing. The second imaging part comprises visible light optics 13 for focusing the incoming visible light onto an array 15 of visible light sensing elements in a way known per se. The data registered by the array 9 are forwarded to a processing unit 17 that processes the data to produce a suitable image, which may be a visible light image, an IR image or a blended or fused image of IR and visible light images. The camera also preferably comprises at least one display means 19 for displaying images and at least one memory unit 21 for storing registered image data and/or processed images.

The camera is preferably also provided with a laser pointer 23, known per se, which may be used to point out objects in the image.

According to the invention a new way of fusing the IR and visible light data is proposed, in the case when visible light image data are displayed in part of the image and IR data are displayed in another part. When selecting an area of the image for which IR data is to be displayed, the temperature range for the IR image is restricted to the temperature range that is relevant for this area. This temperature range may be selected. Alternatively, a temperature range of interest may be selected directly. The colouring scheme of the IR image can then be adapted to the selected temperature range, to improve the resolution in the IR image.

Hence, according to the invention, an area of the image, or a temperature range can be selected. Pixels in the selected area, or pixels having a temperature within the temperature range, will be shown as IR data. The remaining pixels will be shown as visible light image data. For example, if the temperature in the whole image ranges from 15 degrees Celsius to 30 degrees Celsius, in the prior art, the colouring scheme would be adapted to this temperature range, even if the only IR data displayed would be in a part of this temperature range, for example 25-30 degrees Celsius. Therefore, the interesting temperature range of 25-30 would only use the upper part of the colouring scheme, making it hard to distinguish between the colours in this area.

According to the invention, in this case the colouring scheme would be adapted to show 25 degrees as the coldest temperature and 30 degrees as the warmest temperature. In this way, the resolution would be increased, so that it would be easier to distinguish between temperatures within the temperature range of interest.

Hence, according to the invention, the colouring scheme of the IR data is adapted to the temperature range of the part of the image selected to be displayed as IR image data.

The selected temperature range, for which IR data should be displayed, may be selected as an absolute range, for example from 20 to 30 degrees. It may also be a number of degrees at either end of the total temperature range of the image, for example a number of degrees below the maximum, or above the minimum degree of the total temperature range. It may also be selected as a relative range, for example a certain fraction of the temperature range, such as the upper, or lower, 10%, or 50% of the total temperature range. For example, if the total temperature range is 0-100 degrees Celsius the upper 10% would mean that temperatures between 90 and 100 degrees Celsius would be displayed as IR image data in the fused image, and that the whole colouring scheme would be applied in the temperature range between 90 and 100 degrees.

Figure 2:
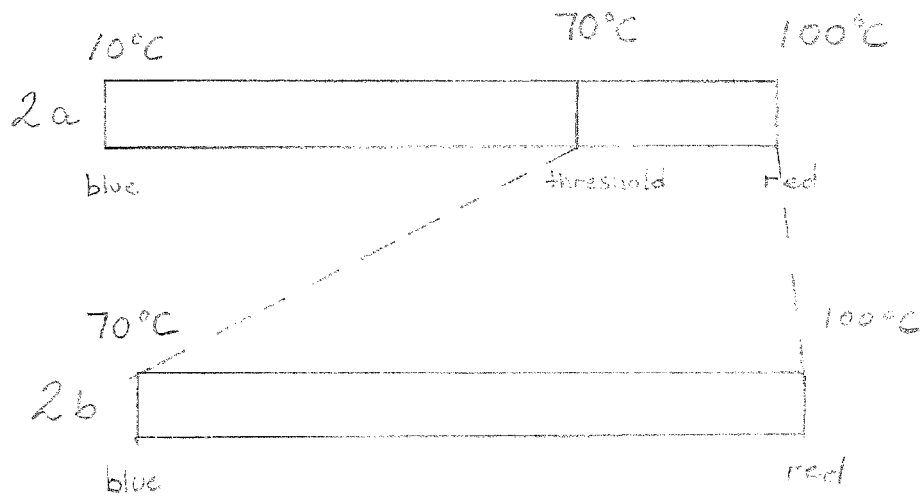
FIG. 2 illustrates an example of the change of temperature range according to an embodiment of the invention

FIG. 2 illustrates, as an example, a first temperature range 2a from 10° C. to 100° C., which is the temperature range of the whole field of view covered by the IR imaging part. A colouring scheme ranging from blue for the lowest temperatures to red for the highest temperatures is used. A threshold is set, in this example, at 70° C. The pixels between 70° C. and 100° C. will be displayed as IR data in the fused image. According to the prior art, each IR pixel would keep the same colour as in the colouring scheme shown in 2a when fused into the fused image. Hence, all the pixels representing temperature data in the fused image would probably be some shade of red. According to the invention, on the other hand, the colouring scheme is changed so that the entire range of colours is used for the temperatures that will be presented as temperature data in the image. This means that the pixels representing temperature data in the blended image would range from blue colours at 70° C. to red colours at 100° C. Hence, according to the invention the temperatures in the range actually displayed in the image can be distinguished more easily by an operator.

Instead of selecting a temperature interval at the upper end of the range, as shown in FIG. 2, an interval at the lower end of the range, or in the middle of the range may be selected, for example 10° C. to 15° C. or 30° C. to 32° C. or any other suitable interval depending on the area or object of interest.

The invention claimed is:

1. A method of displaying together IR image data spanning a first temperature range and visible light image data corresponding to the same field of view in the same image, the method comprising:
    (a) determining a second temperature range corresponding to the range of temperatures in the IR image data to be displayed in a first portion of the image, wherein the IR image data in the first portion of the image is a subset of the IR image data for the entire image, and the second temperature range is a subset of the first temperature range;
    (b) assigning colours from a colouring scheme to temperatures in the second temperature range, wherein the colouring scheme has a first number of colours, a second number of colours are assigned to the second temperature range, and the second number of colours represents a larger proportion of the first number of colours as compared to the second temperature range's proportion of the first temperature range; and
    (c) displaying IR image data in at least the first portion of the image and visible light image data in at least a second portion of the image, wherein the temperatures in the first portion of the image are displayed according to the colour assignments in (b), thereby improving the resolution of the display of the IR image data in the first portion of the image.

2. A method according to claim 1, wherein the at least first portion of the image is selected as at least a first portion of the image having a temperature within a selected temperature range.

3. A method according to claim 1, wherein the at least first portion of the image is selected as at least a first portion of the image comprising an object, or part of an object, or interest.

4. A method according to claim 1, wherein the colours assigned to the temperatures from the second temperature range are assigned from the entire range of colours in the colouring scheme.

5. A camera comprising:
    a first imaging part for capturing IR image data spanning a first temperature range of a first field of view;

a second imaging part for capturing visible light data of a second field of view at least partially overlapping the first field of views;

memory storing instructions for:
- (a) adjusting the first and second field of view relative to each other in dependence of the focusing distance of the first or second imaging part;
- (b) selecting at least a first portion of the image in which IR image data is to be displayed according to the colour assignments in (c) and at least a second portion of the image in which visible light image data is to be displayed, wherein the IR image data in the first portion of the image spans a second temperature range, the IR image data in the first portion of the image is a subset of the IR data of the entire image, and the second temperature range is a subset of the first temperature range;
- (c) assigning colours from a colouring scheme to temperatures in the second temperature range, wherein the colouring scheme has a first number of colours, a second number of colours are assigned to the second temperature range, and the second number of colours represents a larger proportion of the first number of colours as compared to the second temperature range's proportion of the first temperature range, thereby improving the resolution of the display of the IR image data in the first portion of the image; and a processing unit for executing the instructions.

6. A camera according to claim 5, further comprising: a user interface for receiving information about the at least first portion of the image.

7. A camera according to claim 5, further comprising a user interface for selecting the relevant temperature range.

8. A camera according to claim 6, wherein the colours assigned to the temperatures from the second temperature range are assigned from the entire range of colours in the colouring scheme.

* * * * *